US006215260B1

United States Patent
Hinds

(10) Patent No.: US 6,215,260 B1
(45) Date of Patent: Apr. 10, 2001

(54) CONTROLLING MOVEMENT OF LINEAR INDUCTION MOTOR

(75) Inventor: Walter E. Hinds, Beverly Hills, CA (US)

(73) Assignee: Northern Magnetics, Inc., Santa Clara, CA (US)

( * ) Notice: Subject to any disclaimer, the term of this patent is extended or adjusted under 35 U.S.C. 154(b) by 0 days.

(21) Appl. No.: 09/374,156

(22) Filed: Aug. 13, 1999

Related U.S. Application Data

(60) Provisional application No. 60/098,231, filed on Aug. 28, 1998.

(51) Int. Cl.[7] .................................................. H02P 21/00
(52) U.S. Cl. .................................................. 318/135; 318/687
(58) Field of Search ........................... 310/12, 13, 14; 74/471 XY, 479.01; 33/1 M; 318/135, 687

(56) References Cited

U.S. PATENT DOCUMENTS

| | | | |
|---|---|---|---|
| 3,735,231 | 5/1973 | Sawyer | 318/687 |
| 4,654,571 | 3/1987 | Hinds | 318/687 |
| 4,704,568 | 11/1987 | Beck et al. | 318/687 |
| 5,559,419 * | 9/1996 | Jansen et al. | 318/808 |
| 5,648,690 | 7/1997 | Hinds | 310/12 |
| 5,763,966 | 6/1998 | Hinds | 310/12 |
| 6,069,416 * | 5/2000 | Chitayat | 310/12 |

FOREIGN PATENT DOCUMENTS

| | | |
|---|---|---|
| 0790701A2 | 8/1997 | (EP) . |
| 0790701A3 | 11/1997 | (EP) . |

* cited by examiner

*Primary Examiner*—Nestor Ramirez
*Assistant Examiner*—Judson H. Jones
(74) *Attorney, Agent, or Firm*—Thompson Coburn LLP

(57) ABSTRACT

A vector controlled system for two AC induction linear motors to effect dual axis planar motion. There are two or four motors located in a shuttle element. The element is mounted on a smooth face, which includes a glass surface on which the shuttle moves on an air bearing. Vector control for each of the motors accurately controls motor operation in a single axis. Accurate control of a shuttle is obtained in the orthogonal movement under the action of the motors which are respectively arranged for relatively orthogonal movement. Feedback means between the motors and linear scales formed in the backiron associated with the glass face facilitates the controlled positioning of the motors and the shuttle element on the glass face.

18 Claims, 8 Drawing Sheets

CONTROLLING MOVEMENT OF LINEAR INDUCTION MOTOR

This application claims benefit of provisional application No. 60/098231, filed Aug. 28, 1998.

BACKGROUND OF THE INVENTION

Having a system for moving a shuttle element on a surface accurately, with high speed and in a selected orthogonal plane is highly desirable.

This invention relates to linear motors for moving a shuttle element over a plane in an orthogonal manner. In particular, the invention relates to AC linear induction motors for moving the element on the plane. The invention is also concerned with controlling the movement of single axis linear induction motor on a planar surface.

Different systems have been developed for moving a shuttle element over a plane in an orthogonal pattern. One of these systems is that disclosed in U.S. Pat. No. 3,376,578 (Sawyer). This system operates with four motors incorporated in a shuttle element moving over a magnetic platen. These motors are variable reluctance motors or stepping motors which are open loop. There is a limit on the amount of force which can be generated in such motors and therefore a limitation on the amount of movement that can be obtained from such motors. There is also no feedback applied to such motors. As a result, the open loop system is one which depends on the accuracy of the platen machining. There are therefore substantial limitations in providing an effective motion control.

An alternative way of moving a shuttle element over a surface is that described in U.S. Pat. No. 4,654,571 (Hinds). In this system, two DC motors are used to control the movement of the shuttle over a platen. There is a closed loop system in that the platen is formed in a checkerboard pattern of oppositely magnetized permanent magnetic elements with which the motors and the platen can interact. A laser is used at the perimeter of the board for interacting with the platen so as to provide the feedback closed loop to control movement of the motor over the platen. This is a relatively complex system.

It is also disclosed in U.S. Pat. Nos. 5,648,690 and 5,763,966, to have a system of two separate DC motors arranged in orthogonal relationship with each other to move a separate shuttle over a platen. Air bearings are used between the shuttle and the DC motors so that the shuttle is substantially independent of the motors. The contents of that application by the present applicant are incorporated by reference herein.

It is known to have vector control of induction motors rotatable about an axis. This has been described in "AC Motors for Servo Positioning" by John Mazurkiewicz et al. in *Motion Control*, November/December 1991, pages 36–39; "Principles of Vector Control, Parts I and II" by D. Ohm in *PCIM*, August 1990, pages 41–43 and *PCIM*; pages 32–36 and "Understanding AC Vector Drives" by Webb et al. in *Power Transmission Design*, February 1993, pages 17–19.

An AC induction motor, as opposed to the typical DC servo motor, has a non-linear speed vs. torque curve. Also, there are three variables impacting this torque curve compared to essentially one variable in the DC motor case. The AC motor provides a fairly flat speed vs. torque curve, up to the point where the "slip" of the motor begins to exceed a certain percent of the rotating frequency of the motor. Then the speed falls off rapidly, actually resulting in a function that contains two values of speed over a certain torque range (and increasing slip) as the speed finally falls to zero. This condition results in poor torque behavior at zero motor speed. This makes the motor unusable in a positioning system, a classical servo application.

On the other hand, the AC induction motor has many aspects to recommend it for system use. It is usually less expensive, and more reliable, than an equivalent power DC motor because of its less complex construction. Furthermore, as motor size increases into the 1 horsepower and up region, these advantages increase to the point where a DC motor is not competitive economically. So it has been increasingly desirable to find the means to control the AC motor in a manner to overcome its poor static and nonlinear dynamic behavior.

Over time, the equations that govern the AC motor behavior have become well-known. A problem has been the prohibitive cost to implement a control that could execute in real time. With the improvement in feedback transducers and computing power at an attractive price, it has become feasible to provide a level of control that effectively forces the AC motor to behave as though it had the same characteristics as the DC motor.

A known control method for rotational motors is known as vector control. This method employs internal vector control algorithms to control the torque more effectively. This is accomplished by controlling the air gap flux, rotor slip, and total stator current. In order to control these variables, the following motor parameters need to be measured: armature and field current, rotor speed, and temperature. These measured parameters are operated on by a fast processor in order to calculate the voltage to be applied to the armature and field. The processor may be required to perform many thousands of iterations per second in order to control the motor behavior in real time.

In operation, the field current is set by a flux command. The armature is set by the outer loop feedback. This measures the difference between the reference speed and the actual speed to produce the required torque. The stator current is determined by calculating the vector sum of the field and armature current. By modulating the drive voltage applied to the motor, the vector relationship between the rotor speed and slip can be controlled. When this relationship is fixed over the motor speed range down to the stall speed, the resulting behavior of the AC motor vs. voltage command is the same as that of a DC motor.

There are other equations that can be implemented to obtain the net result described above. There are tradeoffs in what is measured and the degree of control achieved. Some of these methods require more precise measurement of certain motor parameters and the precision of control can vary according to the equation being implemented. This is true for linear, as well as rotary, AC induction motors. From a modeling consideration, there is little difference, mostly second-order effects due to the mechanical differences in construction.

There is a need to provide a system for moving an element in the form of a shuttle over a surface in an orthogonal manner using AC induction motors in a manner which minimizes the disadvantages of known systems and uses the advantages of AC induction motors. There is also a need for accurate control of induction motors moving along a single axis on a planar surface.

SUMMARY OF THE INVENTION

By this invention there is provided a system for directing an element over a surface using AC induction motors in a manner which minimizes the disadvantages of prior art methods of moving an element or shuttle over such a surface.

According to the invention there is provided an AC induction motor system for generating compound orthogonal motion. The system uses dual axis planar linear induction motors. There is a first linear AC induction motor for effecting movement of an element in a first of two orthogonal directions. A second linear AC induction motor effects movement of the element in a second of the orthogonal directions.

There is a base for locating the first motor and the second motor relative to each other so that the element is movable in a single plane in their respective orthogonal directions over the base. The base has means for providing a feedback to the first motor and the second motor thereby to control the position of the element on the base. The movement of the shuttle element can be compound orthogonal movement, namely, a combination of each of the respective orthogonal movements.

The invention also includes a control system, preferably vector control, for controlling a pair of AC linear motors arranged in orthogonal relationship relative to each other. The vector control system for the first induction motor and the vector control system for the second motor effectively controls the motor operation in a manner known for controlling rotary AC induction motors. The control system acts to control at least the voltage and frequency of the power supply to the motors in relation to the speed of the motors.

The first motor and the second motor are located in the element, and the element has an air bearing relative to the base.

The base preferably includes a grid, the grid acting as a part of the feedback for the first motor and the second motor. The grid includes a scale in each of the orthogonal directions. The base also includes a smooth surface for locating the motors in the element. The smooth surface is formed by a glass layer located on a metal back iron base. The glass or the metal base contains the linear scales to form the grid.

The grid is arranged with respect to the first motor and the second motor so that the first and second motors in the element are movable on the grid. Feedback means is provided between the grid and the motors. Movement of the motors and the respective location of the associated element over the grid is fed back to the vector control system of the respective motors thereby to control movement of the motors on the grid.

The invention also includes within its scope the grid for providing feedback means to the linear AC induction motors mounted orthogonally on the grid. The smooth glass face of the grid or the backiron have linear scales directed in substantially orthogonal directions. The backiron located under the glass face is provided for interacting with the AC motors as the motors move on the glass face.

The motors respectively include feedback means for reacting with the linear scales of the glass face and/or backiron. A signal is generated indicating movement of the motors with respect to each of the respective linear scales thereby to regulate movement of the motors on the glass face.

A further aspect of the invention is the control of a linear motor on a planar surface using vector control.

The invention is further described with reference to the accompanying drawings.

BRIEF DESCRIPTION OF THE INVENTION

DETAILED DESCRIPTION OF THE PREFERRED EMBODIMENT

Figure 1:
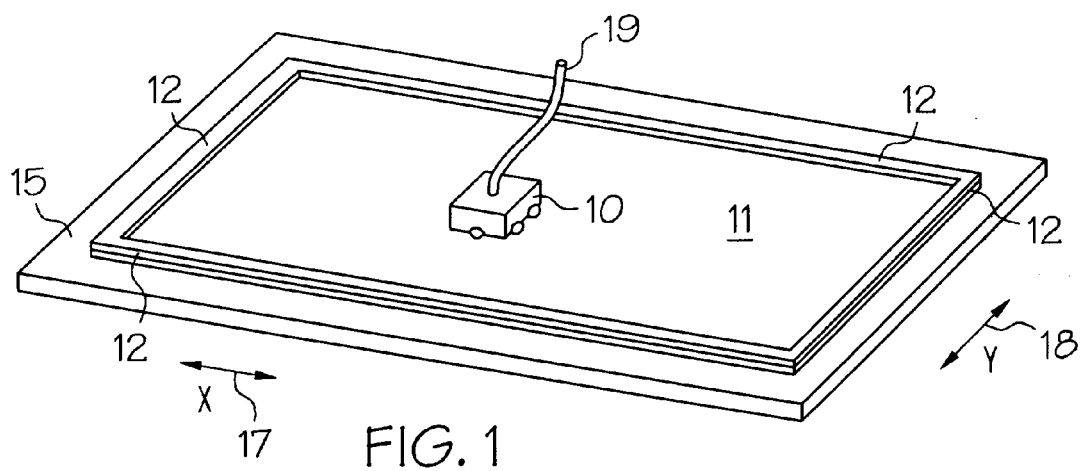
FIG. 1 is a perspective view illustrating a shuttle located on a glass plate.
Figure 2:
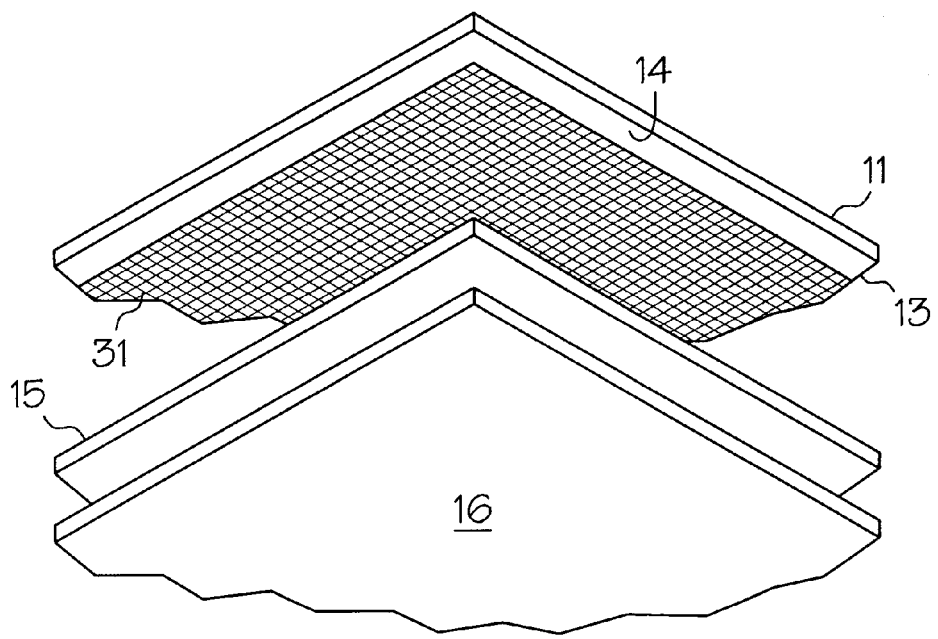
FIG. 2 is a perspective partial view illustrating the underneath of the glass plate, copper plate and back iron.
Figure 3:
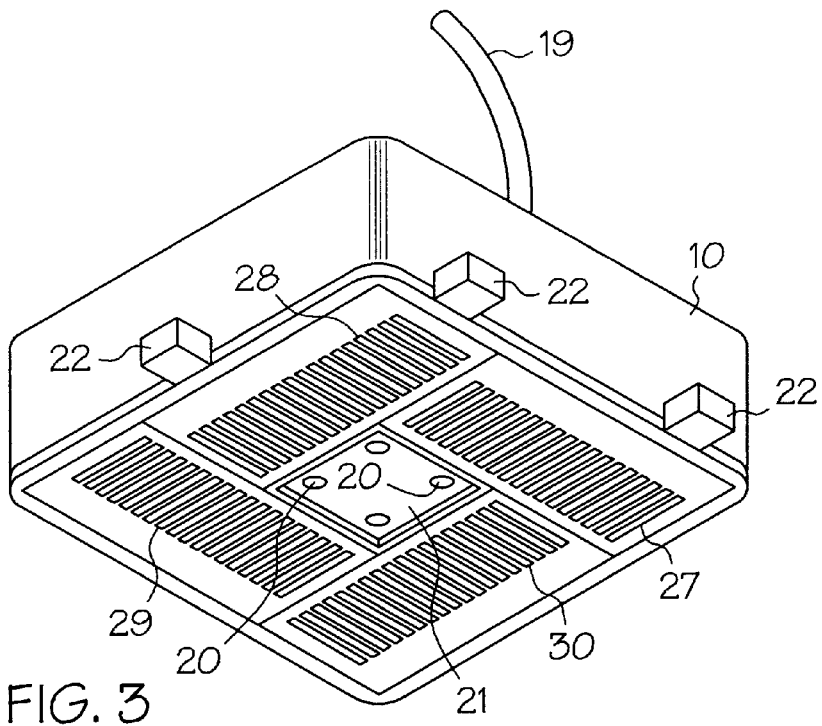
FIG. 3 is a perspective view illustrating the underneath of the shuttle.
Figure 4:
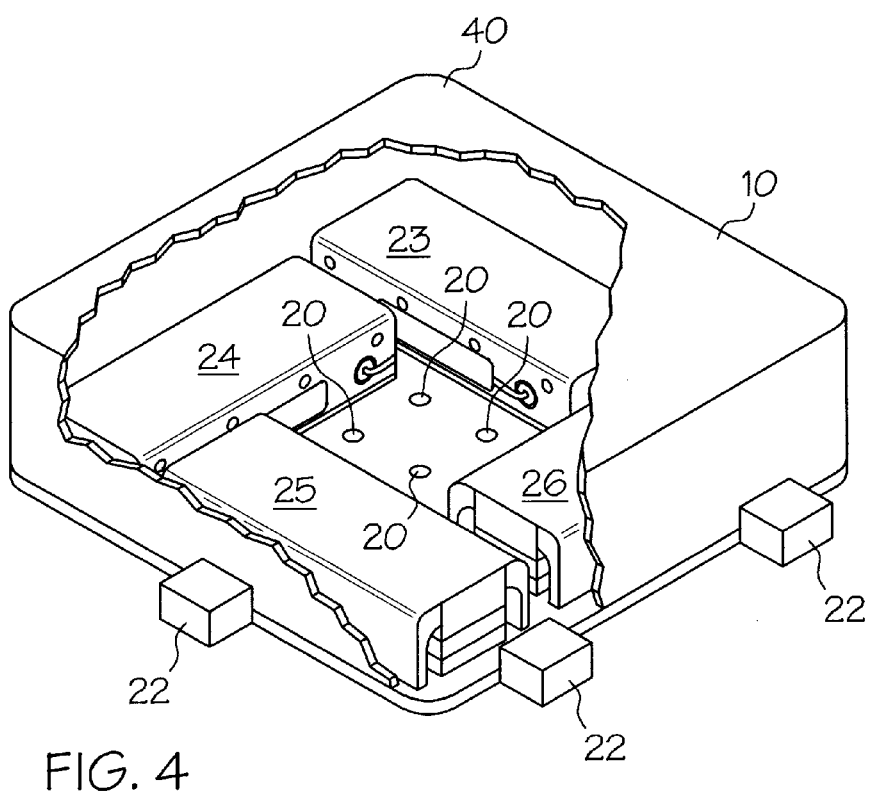
FIG. 4 is a perspective view illustrating the top of the shuttle with part of the casing broken away.

In FIG. 1 there is shown a shuttle 10 which is located on a glass plate 11. The plate 11 is bounded by four perimeter bars 12 to define a rectangular base on which the shuttle 10 can move. The glass 11 has located below it a chromed surface 13 which is etched or formed onto the back 14 of the glass 11. Below the glass 11 and the chrome 13 is a conductive layer, namely a copper base 15, and below that a steel back iron 16. Instead of copper for the layer 15 this can be aluminum or silver.

The shuttle 10 can move in the "X" direction as indicated by arrow 17 and the "Y" direction as indicated by arrow 18. A cable 19 provides electrical power and air to the shuttle 10. The cable 19 has a passage through which air can pass into the casing 40 of the shuttle 10. The outlets for the air are four apertures 20 which are spaced in the base 21 of the shuttle 10. As such the air forms an air bearing. Air which is exhausted through the apertures 20 acts to cause the shuttle 10 to float on the glass 11 as required. This air bearing type operation is a conventional air bearing as would be typical to suspend a shuttle in a DC linear motor shuttle arrangement.

The shuttle 10 is shown in the substantially square shape of casing 40 but in other forms can have any other design shape. Around the perimeter of the shuttle 10 are feedback devices 22 which act to facilitate the positioning of the shuttle 10 in an X-Y direction relative to the glass 11. The devices 22 which are only illustrates on two sides of the shuttle 10 are in fact provided on all sides of the shuttle 10 and act to facilitate interaction with the grid on the glass in a manner to be further described. More or less of these feedback devices 22 can be used.

Inside the casing 40 of the shuttle 10 there are four linear AC induction motor 23, 24, 25 and 26 which are arranged in a rectangular manner around the perimeter of the casing 40 of the shuttle 10. The AC induction motors 23 to 26 are conventional linear AC induction motors. The base of each of the induction motors includes respectively tooth surfaces 27, 28, 29 and 30. Each of these tooth surfaces is part of a means to interact with the grid underface 13 of glass 11. The top face of the glass 11 is smooth and flat.

The AC induction motors 23 to 26 include an elongated magnetizable element with teeth and windings and which acts as a primary or forcer. This elongated linear piece moves over an secondary element constituted by a platen, namely by the back iron. The windings can be lap wound or Gramme wound. Conventional characteristics are provided for each of the AC induction linear motors 23 to 26. The copper plate 15 and back iron plate 16 interact with the induction motors 23 to 26 to control the movement of the motors 23 to 26 over the glass 11. The back iron can be of about 0.4" thickness, and the conducting copper plate is about 0.15" thickness.

The underside of the glass 11 has the chrome grid 13 which is etched to form a series of intersecting straight lines 31 which are directed relatively in the "X", direction and "Y" direction respectively. These lines are about 5 thousands of an inch in width and have a space between them of about 5 thousands of an inch. Viewing the chrome surface 13 with the visible eye will not easily detect the spacing between the chrome lines 31 in each direction. The chrome lines 31 act to provide a scale to interact with each of the motors 23, 24, 25 and 26 and the respectively provided feedback device encoder 22 so that a feedback is provided to the respective motors. The position of the motors on the glass surface 11 can thereby be accurately controlled. In particular the 27 through 30 of the motors interact with rectangular grid 31 to effect a control on the position of the motors and effectively the shuttle 10 on the surface of glass 11 in an orthogonal sense. The encoders 22 and the grid 13 operate on the principles of optical reflective encoding. Other forms of encoding can be used.

This technique provides a mean for accurately having multiple AC induction linear motors interact on a surface so that the motion of the shuttle 10 can be controlled.

The vector control is provided for each of the motors 23 to 26 in a manner of vector control currently known and used for rotational motors. Such vector control systems would include the features described with reference to FIG. 8.

Figure 8:
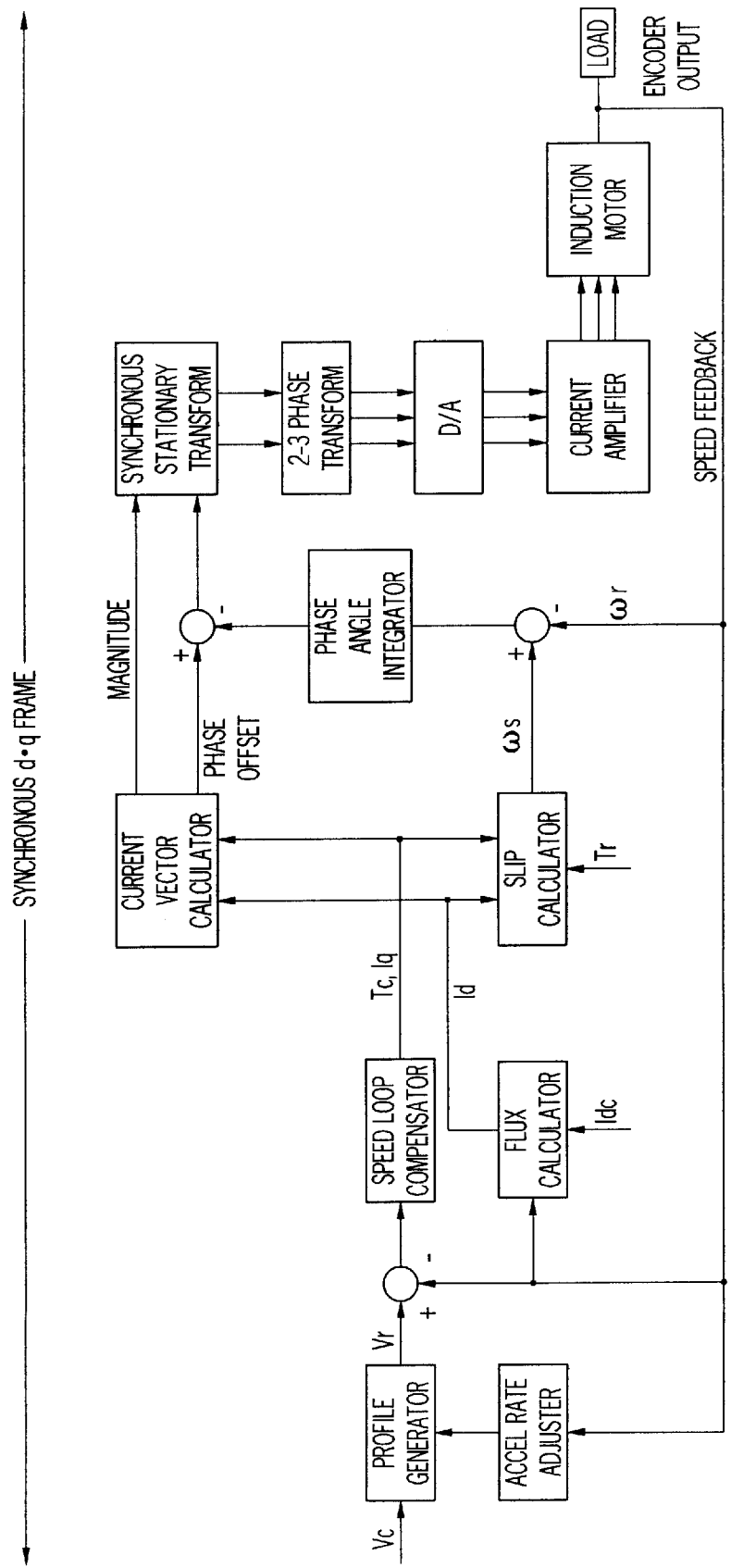
FIG. 8 is a functional block diagram of a vector control which is usable in the system for each of the linear motors.

FIG. 8 shows a functional block diagram of the vector control used in the drive. Except the motor and mounted encoder, all electronics are packaged inside the drive. The drive includes many other functions-handshake logic with NC machine, protective functions and the operator interface etc.

For vector control, which involves many arithmetic calculations of extended resolution, at least a 16-bit microprocessor, or signal processor is required. The ASBTS-20 uses a NEC 78312 16-bit microcontroller with many functions handled by hardware, either through built-in microcontroller logic or on-board logic. This effectively relieves software burdens required with fast sampling time.

From the speed command Vc from a host (operator), a velocity profile, Vr, is generated for every control interrupt cycle. The rate of change in the profile velocity depends on acceleration rate and speed. Vr is then compared to the actual speed of the motor, and the closed-loop compensator determines torque command, Tc, based on the present and past speed errors. Vector control starts from this point. Flux current component Id is calculated from the flux calculator process that simply modifies command flux Idc inversely proportional to the speed above base speed. Because the Tc command is directly proportional to Iq (force-producing current component), it is ready for vector calculation. From two variables Id and Iq, magnitude and phase of stator current vector and produced slip can be calculated. Rotor flux angle can be estimated so the appropriate arithmetic and digital integration process results in a rotor flux angle of the current interrupt cycle. Based on the magnitude and flux angle, the frame transformation process can be done via a combination of hardware and software. The resulting 3-phase stator current commands are transformed to an analog format, filtered and amplified to feed motor current. To eliminate current phase lag due to inductance, a PWM amplifier with high gain current feedback is used.

There are two open-loop parameters which are tuned properly. These are Idc and Tr (rotor time constant). To optimize performance, these are tuned correctly with a load test. Because motor parameter Tr varies as motor temperature changes, peak torque capability may be deteriorated as temperature varies.

Many other examples of the invention exist, each differing from the other in matters of detail only.

Although the relationship has been described with reference to octagonal motion with a grid which has octagonal lines, namely giving at right angle is relative to each mode of travel, a system of the invention also includes of an induction motor operating in a single axis. There is a set of lines transversely formed relative to the teeth 28 of each forcer, for instance of motor 25 which operates to control the motion of that motor in a vector controlled sense. By the term "vector control" is meant the system whereby the voltage and frequency of the power supply to the motor is controlled relative to the motor location, and/or speed and/or velocity.

Figure 7:
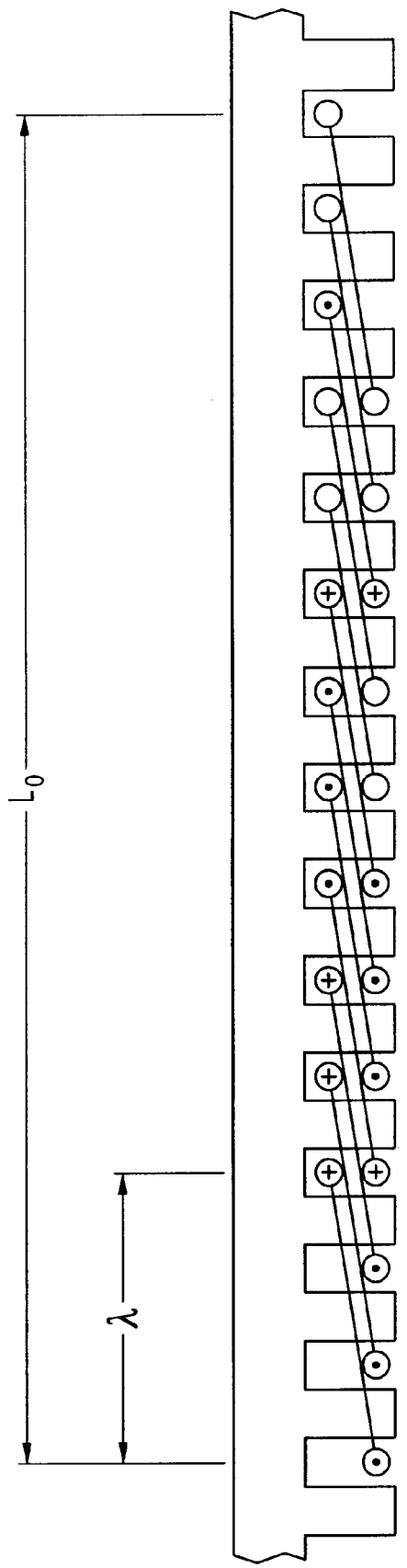
FIG. 7 is a cross sectional view of the forcer of a linear induction motor, showing teeth and windings.

In FIG. 7 there is shown an exemplary detail of a three phase winding of an induction motor with four poles. There can be any number of phases above two and the poles can be increased at the length of the motor Lo increases with the number of poles. FIG. 7 illustrates the primary or forcer portion of the induction motor. The winding illustrated is a lap winding.

Figure 5:
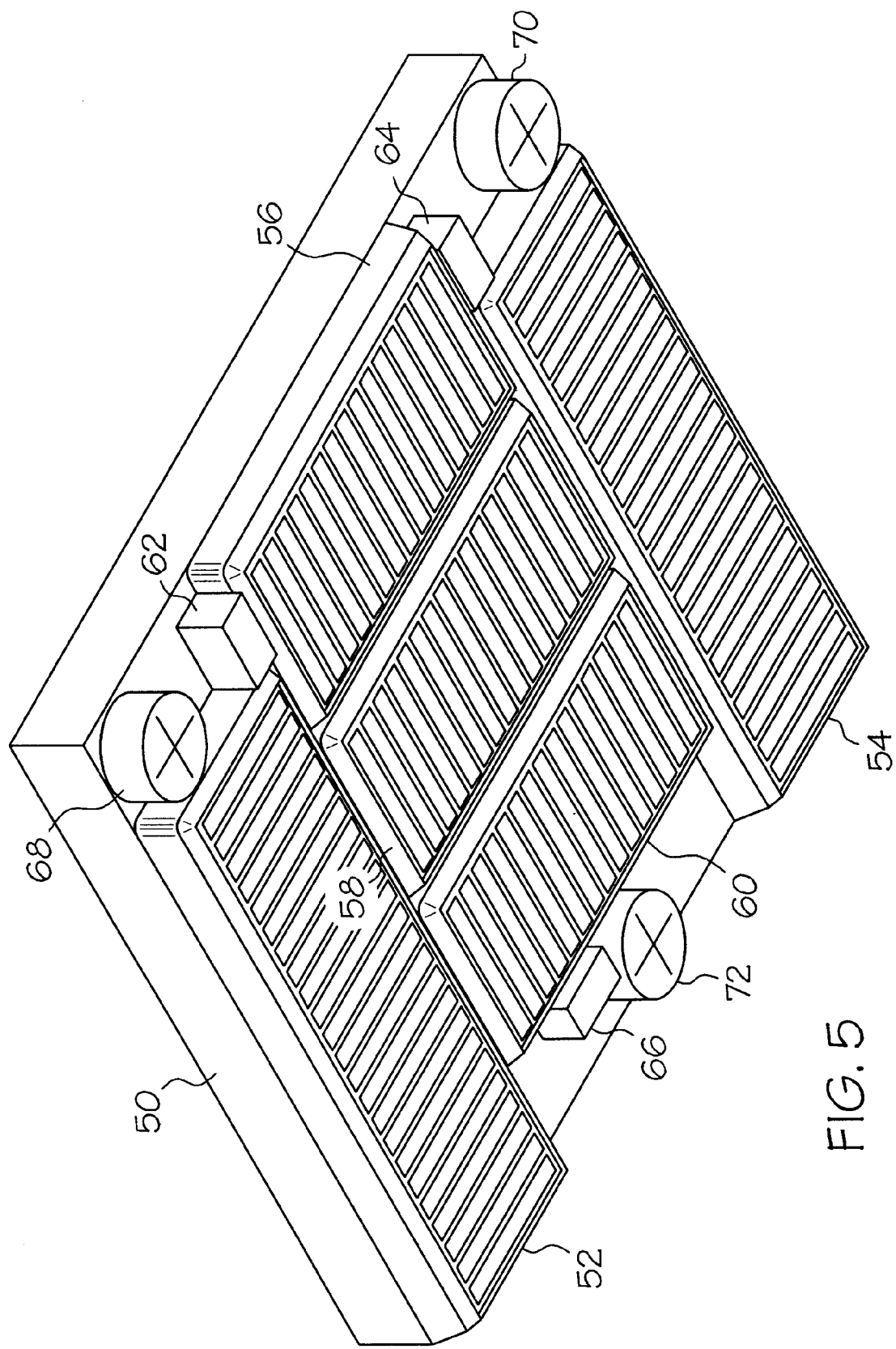
FIG. 5 is a perspective window of a shuttle with a different motor and air bearing configuration.

As illustrated in FIG. 5 there is a different configuration of motor and an air bearing with an element. An element 50 is supplied with power through a conductor or umbilical cord not shown. There are five motors arranged transversely in the element 50. These are motors 52 and 54 in a first direction, and motors 56, 58 and 60 in a transverse longitudinal direction. Three encoder feedback devices 62, 64 and 66 are provided spaced around the underside of the element 50 in adjacency with the motors and at discrete predetermined locations relative to the motors 52, 54, 56, 58 and 60. There are three air bearings 68, 70 and 72 placed on the underside of the element 54. They left the element 50 above the layer or secondary member.

Figure 6:
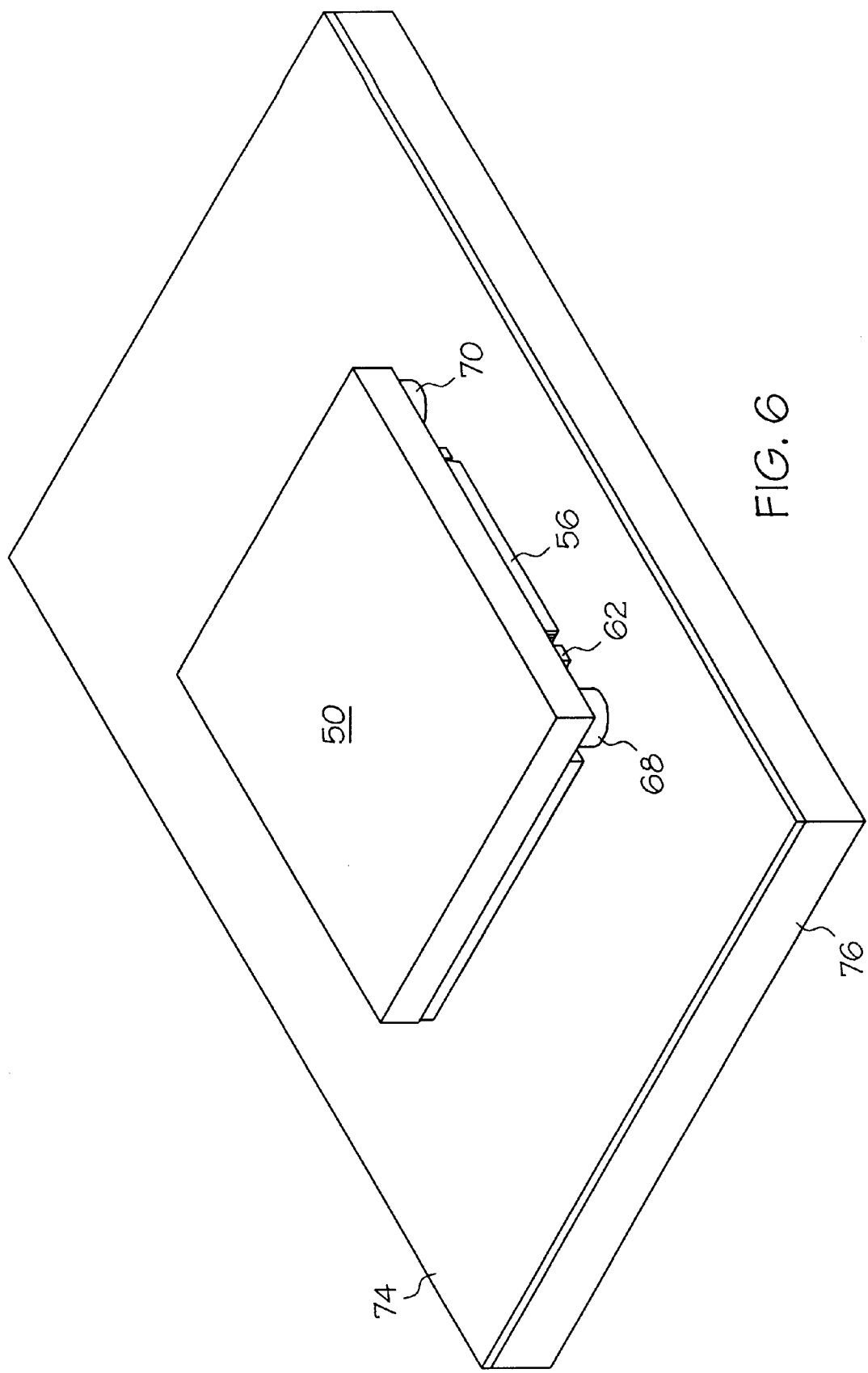
FIG. 6 is a perspective view of a motor on a base bearing a glass top and a back iron.

As shown in FIG. 6, the element 50 rests on a conductive of layer 74 which in turn is mounted on a steel back iron plate 76. The underside of the conductive layer 74 can be vapor deposited or sputtered to provide a grid like pattern similar to that shown as 31 on the underside of the glass 14. In the embodiment of FIG. 6 there is no glass component, and only the conductive layer 74 on the back iron 76.

Figure 9A:
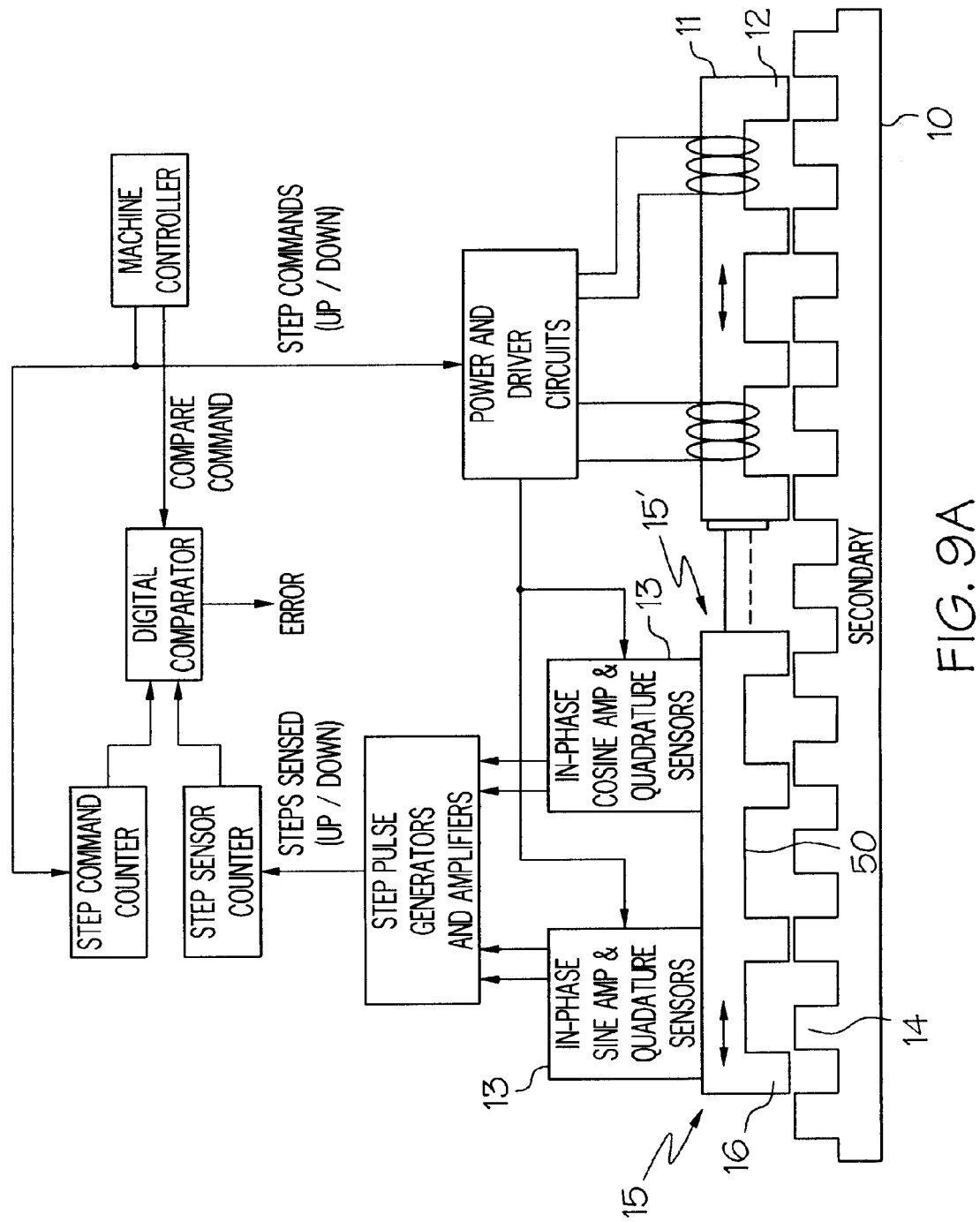
FIG. 9A is a functional block diagram illustrating the encoder action in relation to movement of the motor on the grid plate.
Figure 9B:
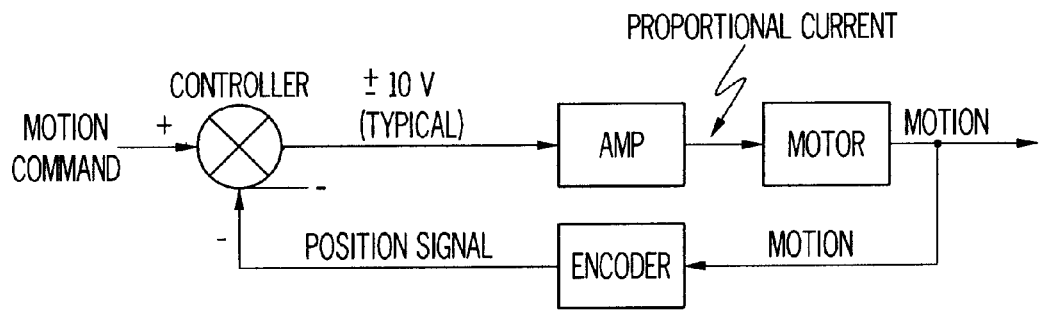
FIG. 9B is an illustration of a typical closed loop servo system for ac/dc linear motors.
Figure 9C:
FIG. 9C is an illustration of a typical open loop positioning system for linear stepper motors.
Figure 9D:
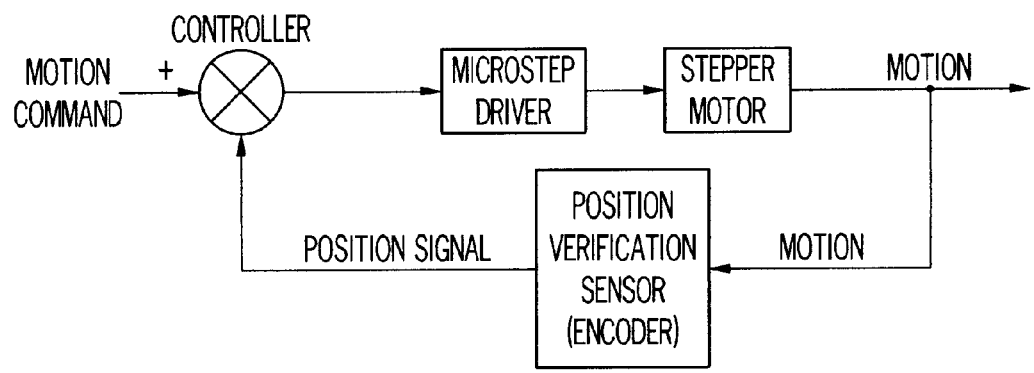
FIG. 9D is an illustration of a typical closed loop positioning system for linear stepper motors.

In FIG. 9A there is shown a configuration of the manner in which the motor operates with the encoder to effect the signals to operate the motor. In FIG. 9B there is shown a typical loop servo system for AC/DC linear motors. In FIG. 9C there is shown a typical open loop positioning system for linear stepper motors. In FIG. 9D there is shown a typical closed loop positioning system for linear stepper motors. This can be similar to the entitled "Sensory and Controlling the Location of Elements in a Linear Motor" by Hinds, et.

al system described in co-pending patent application Ser. No. 08/878,614 filed Jun. 19, 1997, now U.S. Pat. No. 5,880,541, the controls of which are incorporated by reference herein.

In different embodiments of the invention there may only be a first and second AC linear motor in the shuttle 10. These two motors can be rectangularly located with respect to each other. The interaction of these motors can effectively control the "X", and "Y" movement of the shuttle 10 as required.

The interaction of the movement of these first linear motor and second linear motor acts also to control the angular movement of the shuttle element on the base. Thus, if desired the shuttle an be made to move about a central axis in an a controlled angular fashion. In most cases however the shuttle is controlled in movement in the X and Y axes respectively and the angular moment is controlled to be avoided.

In other variation of the invention, instead of the optical encoder, these can be a laser interaction with the shuttle in a manner disclosed in U.S. Pat. No. 4,654,571. Other systems can be used for determining the position of the element and controlling its movement.

The invention is to be determined solely in terms of the scope of the following claims.

What is claimed is:

1. A motor system for generating motion comprising:
a first AC induction linear motor for effecting movement an element in a first of two orthogonal directions,
a second AC induction linear motor for effecting movement of the element in a second of the orthogonal directions,
a vector control system for the first induction motor and a vector control system for the second motor, and
a base for locating the first motor and the second motor relative to each other so that the element is movable in a plane in the respective orthogonal directions over the base, and the base having means for providing feedback to the first motor and the second motor thereby to control the position of the element on the base.

2. A system as claimed in claim 1 wherein the first motor and the second motor are located in the element.

3. A system as claimed in claim 1 wherein the element includes an air bearing relative to the base.

4. A system as claimed in claim 1 wherein the base includes a grid, the grid acting as a part of a feedback for the first motor and as a part of a feedback for the second motor, the grid including a scale in each of the orthogonal directions.

5. A system as claimed in claim 4 wherein the base includes a relatively smooth surface for locating the motors, the relatively smooth surface being formed by a layer located on a metal base, the layer containing linear scales in respective orthogonal directions.

6. A system as claimed in claim 1 wherein the element is substantially square in configuration and wherein there are four motors located on the element, each motor being located along one side of the square element.

7. A system as claimed in claim 1 wherein the interaction of the movement of the first linear motor and the second linear motor acts to control the angular movement of the element on the base.

8. A control system for a pair of AC induction linear motors arranged in orthogonal relationship relative to each other comprising:

a vector control for a first AC induction linear motor, and
a vector control for a second AC induction linear motor, thereby to move an element on a planar surface under the action of the linear motors.

9. A control system as claimed in claim 8 including a grid for mounting respectively the first motor and the second motor, the first and second motors being located in the element movable on the grid, and feedback means between the grid and the motors whereby movement of the motors and the associated element over the grid is fed back to the respective motors thereby to control movement of the motors on the grid.

10. A motor system for generating motion comprising:
an AC induction linear motor for effecting movement an element in a linear direction,
a vector control system for the induction motor, and
a base for locating the motor so that the element is movable in a linear direction over the base, and the base having means for providing feedback to the motor thereby to control the position of the element on the base.

11. A system as claimed in claim 10 wherein the motor is located in the element.

12. A system as claimed in claim 10 wherein the element includes an air bearing relative to the base.

13. A system as claimed in claim 10 wherein the base includes a grid, the grid acting as a part of a feedback for the motor, and of the grid including a scale in the linear direction.

14. A system as claimed in claim 13 wherein the base includes a relatively smooth surface for locating the motor, the relatively smooth surface being formed by a layer located on a metal base, the layer containing the linear scale.

15. A system as claimed in claim 14 wherein the layer is formed from a conductive material, and wherein the grid is deposited on the layer.

16. A system as claimed in claim 13 wherein the layer is formed from a conductive material, and wherein the grid is deposited on the layer.

17. A motor system for generating motion comprising:
a first AC induction linear motor for effecting movement an element in a first of two orthogonal directions,
a second AC induction linear motor for effecting movement of the element in a second of the orthogonal directions,
a system for controlling the voltage and frequency of the power supplied to the first induction motor and the second motor, and
a base for locating the first motor and the second motor relative to each other so that the element is movable in a plane in the respective orthogonal directions over the base, and the base having means for providing feedback to the first motor and the second motor to control the voltage and frequency and thereby to control the position of the element on the base.

18. A system as claimed in claim 17 wherein the first motor and the second motor are located in the element, the element includes an air bearing relative to the base, and the base includes a grid, the grid acting as a part of a feedback for the first motor and as a part of a feedback for the second motor, and the grid including a scale in each of the orthogonal directions.

* * * * *